United States Patent [19]

Wiley, Jr. et al.

[11] 4,084,846
[45] Apr. 18, 1978

[54] UNIVERSAL SUPPORT ASSEMBLY FOR DRAG REDUCING EQUIPMENT

[75] Inventors: Nathaniel C. Wiley, Jr., Weston; William L. Jensen, Jr., Beacon Falls, both of Conn.

[73] Assignee: Rudkin-Wiley Corporation, Stratford, Conn.

[21] Appl. No.: 716,127

[22] Filed: Aug. 20, 1976

[51] Int. Cl.² ............................................. B62D 35/00
[52] U.S. Cl. ..................................... 296/1 S; 105/2 R
[58] Field of Search .................. 296/1 S, 91; 105/2 R, 105/2 A; 180/1 FV

[56] References Cited

U.S. PATENT DOCUMENTS

| 3,697,120 | 10/1972 | Saunders | 296/1 S |
|---|---|---|---|
| 3,822,910 | 7/1974 | Wiley | 296/1 S |
| 3,929,369 | 12/1975 | Blair | 296/1 S |
| 3,971,586 | 7/1976 | Saunders | 296/1 S |

Primary Examiner—Joseph F. Peters, Jr.
Assistant Examiner—John A. Carroll
Attorney, Agent, or Firm—Mattern, Ware, Davis and Stoltz

[57] ABSTRACT

By providing a completely adjustable support system for securely mounting drag reducing equipment to the roof of a land transport vehicle forward of a drag producing surface with the support system secured to the roof in a configuration which allows the drag reducing equipment to be positionable in a plurality of orientations forward of the drag producing surface with the support system adjustable for mounting to any roof, a universally adjustable drag reducing equipment support system is achieved. In the preferred embodiment, the universally adjustable support system incorporates elongated support members, support struts and adjustable brackets which have a plurality of securement positions for complete adjustable interconnection of the support system to any vehicle regardless of the vehicle's configuration and secure support of the drag reducing equipment in any desired position.

19 Claims, 4 Drawing Figures

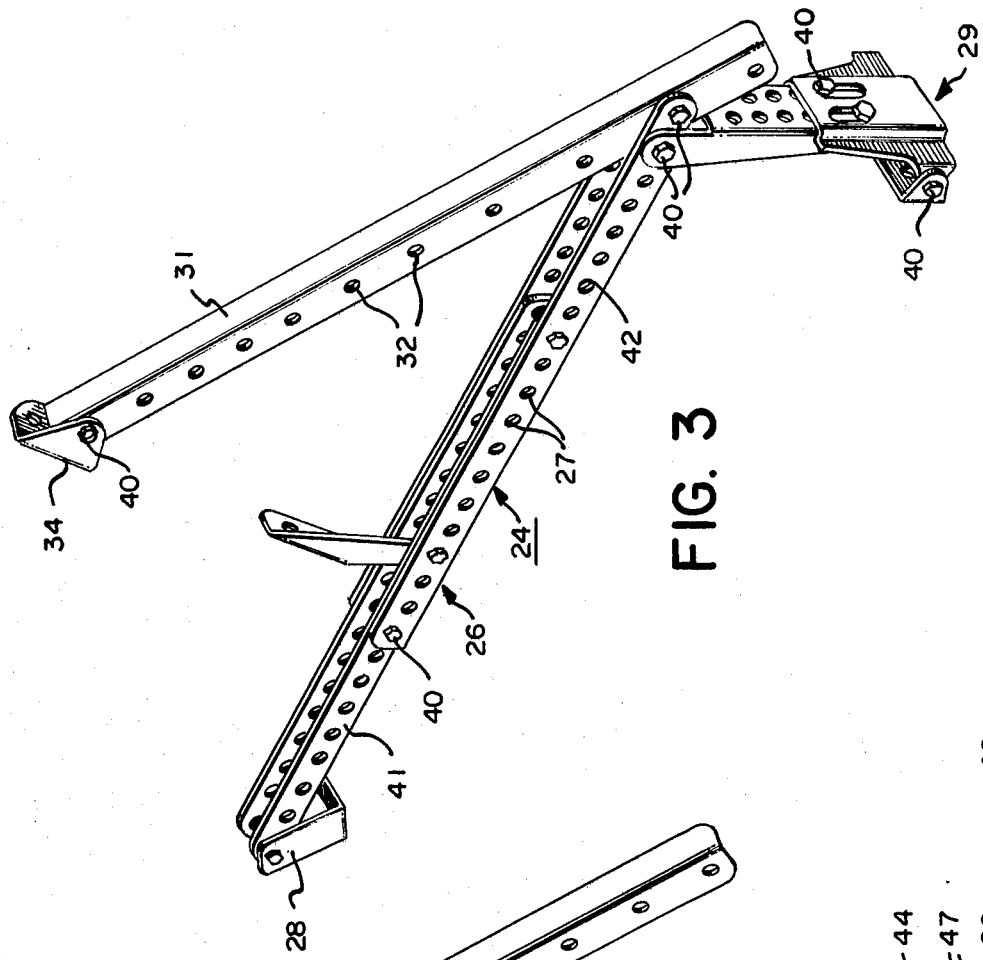
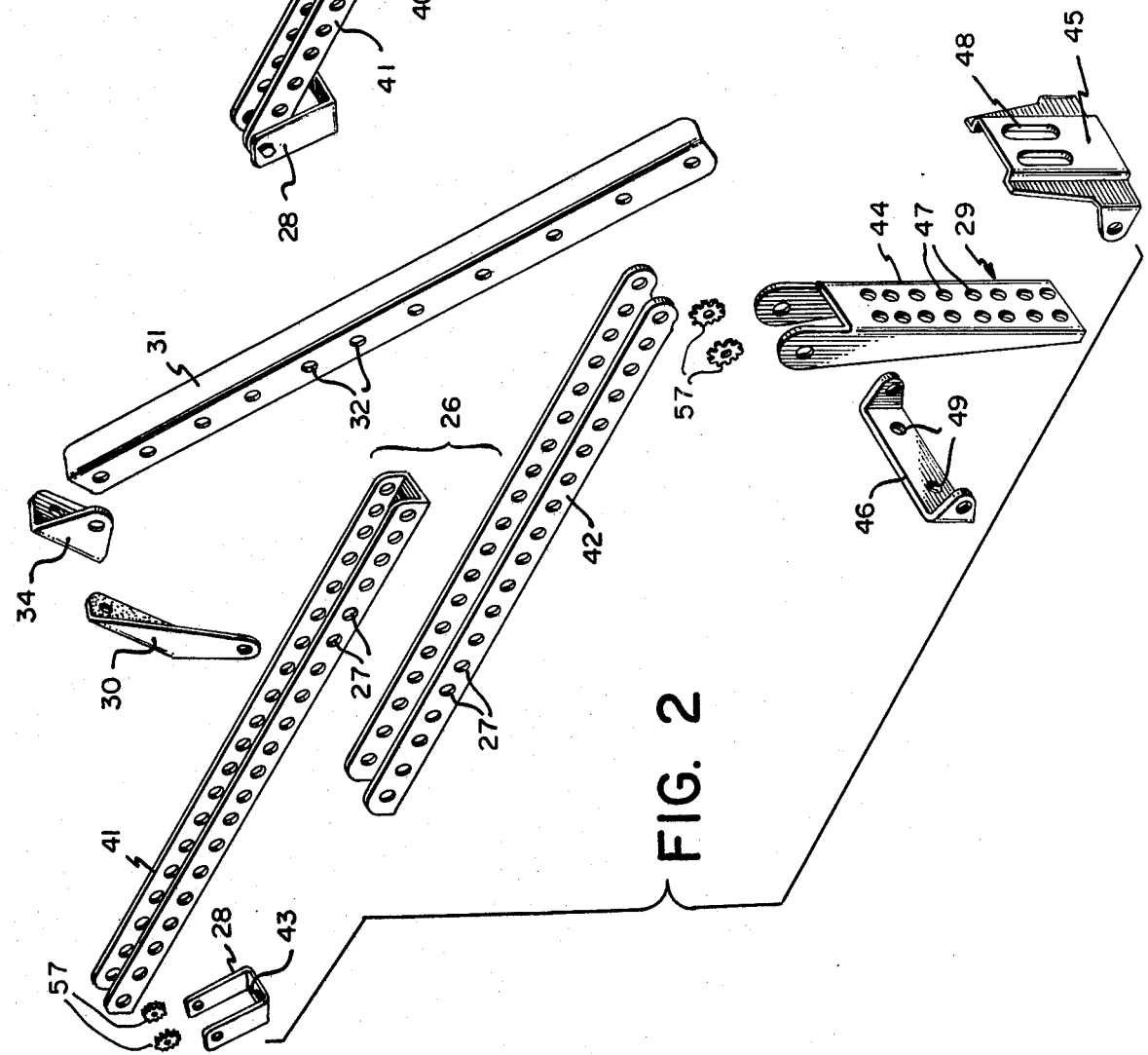

UNIVERSAL SUPPORT ASSEMBLY FOR DRAG REDUCING EQUIPMENT

BACKGROUND OF THE INVENTION

This invention relates to universal drag reducing equipment support systems and more particularly to multiple positionable universally adjustable support systems.

In order to securely hold drag reducing equipment on the roof of land transport vehicles, a variety of different mounting systems have been developed, with all of these systems requiring different hardware depending upon the particular cab roof configuration. In some of the systems which proclaim to be universal, elastic material in combination with hooks have been employed. However, the elastic material has been found to be totally unable to withstand the forces which impinge upon the baffle when in operation. As a result, these support systems are totally useless.

A further problem with prior art support systems is the fact that the systems are not mounted to the cap roof at points where the cap roof is the strongest. Consequently, although the system may incorporate solid hardware, the securement of this hardware to weak areas in a cab roof has resulted in failures when the forces generated upon the baffle have been great enough to rip the mounting systems away from their securement locations. Finally, the requirement in all prior art systems for different hardware, depending upon the cab configuration, has proven to be very undesirable because of the additional space and money required for producing and maintaining a large inventory. The support system which typifies these prior art systems is shown in Wiley, U.S. Pat. No. 3,822,910.

OBJECTS OF THE INVENTION

A principal object of the present invention is to provide a support system for drag reducing equipment which is completely universal, employs the identical hardware for all roof configurations, and is securely mountable to any roof configuration.

Another object of the present invention is to provide a universal drag reducing equipment support system incorporating the characteristics defined above which is mountable to any land vehicle configuration at the strongest mounting points of that vehicle.

Another object of the present invention is to provide a universal drag reducing equipment support system having the characteristics defined above which is capable of being completely adjusted to position the drag reducing equipment in any desired position.

Other more specific objects will in part be obvious and will appear hereinafter.

SUMMARY OF THE INVENTION

The universal drag reducing equipment support systm of the present invention is capable of secure interconnection to the cab roof of any land vehicle, and incorporates a telescoping elongated support member, having front and rear bracket members mounted thereto, a drag reducing equipment securing bracket, and a drag reducing equipment support strut, all of which are interconnected to provide the rigid support required for the drag reducing equipment.

One typical drag reducer which is mounted to the support assembly is a wind deflector. With a wind deflector mounted thereto, the universal support assembly of the present invention provides the wind deflector with the capability of being movably pivoted into any desired angular relationship as well as being positioned at any desired location forward of a drag producing surface. This assures the correct positioning of the wind deflector, regardless of the vehicle configuration.

In the preferred embodiment, the universal support system comprises a telescoping elongated support member incorporating two slidably engaged channel members, each of which has a plurality of spaced holes along the sides thereof. Using these holes, the overall length of the channel member can be adjusted to any desired length, for mounting to any vehicle, and the wind deflector securing bracket can be pivotally mounted to the channel member in any position along the length of the channel member.

At the front of the elongated channel member, a roof bracket is located for securement to the front edge of the roof of any cab, just above the windshield thereof. This position is preferred since structural reinforcements are usually present within the roof structure itself, thereby assuring a secure and stable mounting position for the universal support system. Also, the need for interior roof bracing and reinforcement plates, which is common with the prior art systems, is completely avoided.

At the rear of the elongated support member, a rear bracket is located for securement to the rear of the cab roof. The rear bracket incorporates a plurality of spaced locator holes in order to allow the rear bracket to be adjustable for secure interconnected mounting to the rear side of the cab in the area of the rain gutter. This position is preferred, since the rear of the cab has its maximum strength along the gutter line. Since the particular location of the gutter line may vary from one roof to the other, this rear bracket is completely adjustable to accommodate secure interconnection to any cab configuration. Also, the rear bracket incorporates a pivotable cab mounting plate for secure interconnection to the cab wall regardless of the curvature of the wall.

The universal support system is completed by a support arm or strut which is pivotally secured at its upper end near the top edge of the wind deflector. The support strut is also constructed with a plurality of spaced holes along its length, in order to provide an adjustable securement point for its lower end with the elongated channel member. Consequently, by securing the support arm to the rear end of the elongated channel member in one of the various spaced holes along the length of the support arm, the angle of the wind deflector with the vertical can be easily controlled and properly adjusted. Also the bolt can be easily removed for folding the wind deflector down when not in use. A transverse control arm laterally spaces the rear ends of the support struts or the elongated support members apart.

The invention accordingly comprises a product possessing the features, properties,, and relation of components which will be exemplified in the product hereinafter described, and the scope of the invention will be indicated in the claims.

THE DRAWINGS

For a fuller understanding of the nature and objects of the invention, reference should be had to the following detailed description taken in connection with the accompanying drawings, in which:

FIG. 2 is an exploded perspective view of the universal support system of the present invention;

FIG. 3 is an assembled view of the universal support system of the present invention.

Throughout the several figures of the drawings, like reference numerals are employed for reference to the same elements.

DETAILED DESCRIPTION

Figure 1:
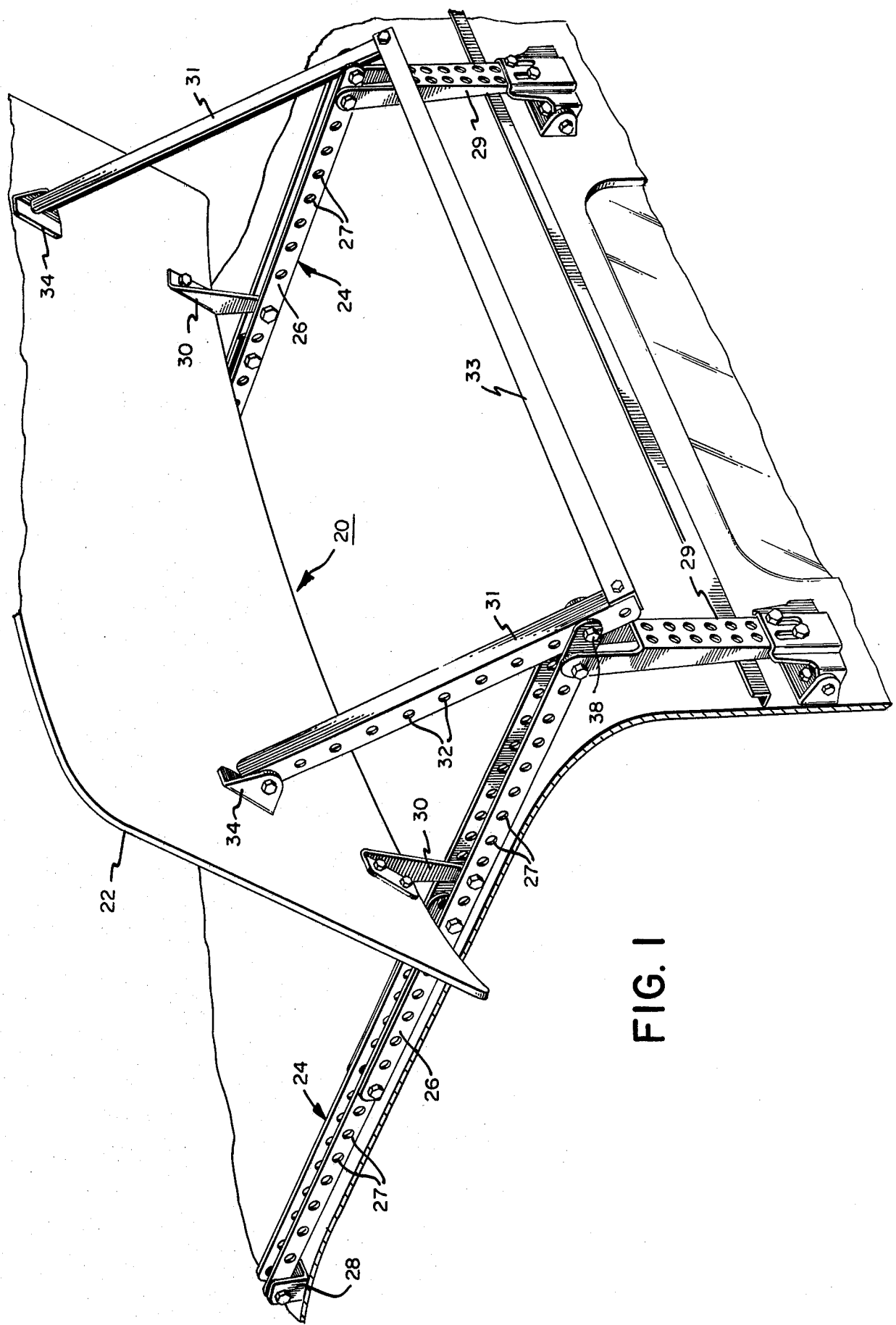
FIG. 1 is a perspective view of the universal support system of the present invention mounted to a cab roof with a wind deflector secured thereto.

In FIG. 1, the universal drag reducing equipment support system 24 of the present invention is shown supporting a wind deflector or a wind deflecting baffle 22. The universal support system 24 incorporates a telescoping elongated support member 26, a front cab bracket 28, a rear cab bracket assembly 29, a wind deflector pivot-inducing bracket 30, a wind deflector support bracket 34, a wind deflector support arm 31, and a transverse control arm 33. Elongated support member 26 incorporates a plurality of spaced securement holes 27 along both of its sides, and support arm 31 incorporates spaced securement holes 32 along its side surface. As shown in FIG. 1, in the preferred embodiment, two separate universal support systems are employed to securely hold wind deflector 22 in position with only the transverse control arm 33 interconnected between both assemblies.

By employing universal support system 24 of the present invention, wind deflector 22 is adjustably positionable into any desired angular relationship with respect to the vertical, as well as being movable into any desired position forward of a drag producing surface. The actual position of wind deflector 22 is easily adjusted by moving wind deflector bracket 30 into any of the desired securement holes 27 along elongated channel member 26. The angular relationship of the wind deflector surface to the vertical is easily adjusted by employing various securement holes 32 of support arm 31. Transverse control arm 33 is employed to controllably and easily move wind deflector 22 into the desired angular relationship before securely bolting wind deflector 22 in a desired position by the secure interconnection of support arm 31 with elongated channel member 26.

The universal support system 24 of the present invention provides a support assembly which is completely universal for direct mounting to any cab roof regardless of its construction or particular design. Furthermore, the support system 24 of the present invention is constructed to be securable directly to the areas on the cab which are reinforced and consequently, are the strongest securement locations in the vehicle. By achieving a truly universal support system, a single system is provided for securement to each and every type of cab roof, thereby eliminating the need for stocking additional hardware usable on only particular models.

In FIGS. 2 and 3, the universal support system 24 is shown in detail, with FIG. 2 showing the elements of a left side support system 24 in an exploded view. Telescoping elongated support member 26 comprises two slidingly engaged channel sections 41 and 42. Each of the channel sections 41 and 42, which form the telescoping elongated adjustable support member 26, incorporate a plurality of spaced securement holes 27 along both of their parallel sides. Consequently, the overall length of support member 26 can be easily adjusted to extend from the front to the rear of any cab roof, regardless of the length of the cab roof. Once the desired length for channel member 26 has been obtained by slidingly moving channel section 41 within channel section 42, the desired position is secured by bolting channel section 41 to channel section 42 by bolt means 40, or any other suitable fastening means. This overlapping assembly not only provides the desired telescoping feature, but also places maximum steel material at the area of maximum stress, thereby achieving a minimum strain on the channel members.

Front cab bracket 28 is pivotally bolted to the forwardmost securement holes 27 of channel section 41. In this way, front cab bracket 28 can be easily bolted directly to the forward edge of the cab roof near the windshield area. This particular area of the cab is preferred since cabs are usually constructed with several layers of metal incorporated therein. Consequently, the bracket is secured to the area of maximum strength and a minimum deflection is achieved. Furthermore, in most cab constructions this preferred bolting area is forward of the cab headliner. As a result, the time-consuming and expense of removing the headliner, commonly found in prior art units, is completely eliminated. Another advantage of this position is the ability to use nut-inserts which are completely installable from outside of the cab, thereby eliminating the necessity for drilling through the roof and attaching a nut and bolt, which requires two pairs of hands, a procedure common with prior art systems.

In the preferred embodiment, front cab bracket 28 incorporates a substantially U-shaped bracket member wih cab securement holes 43 formed therein. Since front cab bracket 28 is capable of pivoting about channel member 41, any particular front to back slope or contour of the cab roof can be accommodated and bracket 28 can be easily bolted thereto. It has been found that although some cab roofs are constructed with a side-to-side curvature, the short length over which bracket 28 actualy contacts the roof allows bracket 28 to be easily securable to the cab roof regardless of the roof's curvature or configuration. This arrangement eliminates the common prior art need for pivotable bolt assemblies, interior roof backing, and reinforcement plates.

The wind deflector itself is supported along its base by wind deflector pivot-inducing bracket 30 and is also supported at its upper edge by the combination of a wind deflector support bracket 34 and a wind deflector support strut or arm 31. In the preferred embodiment, wind deflector support strut 31 comprises an elongated angle iron and incorporates a plurality of spaced supporting holes 32. Wind deflector support strut 31 is pivotally engaged with wind deflector support bracket 34 by interconnecting these two members through a securement hole 32 of support arm 31 at the upper terminating end of strut 31. The lower end of wind deflector support strut 31 is secured, preferably by a quick disconnect fitting 38, to channel section 42 at the terminating end of channel section 42, by employing the last securement holes 27 of channel section 42 and one of the holes 32 of support strut 31. By using quick disconnect bolt means 38, wind deflector 22 can be easily moved into a horizontal non-operational or collapsed mode when not in use or when the cab must be driven through a low entry portal. By employing the construction of this invention, wind deflector 22 can be moved into this horizontal position quickly and easily without interfering in any way with rear bracket assembly 29, a problem commonly found in prior art systems. Brackets 30 may be mounted either on the front face or the rear face of wind deflector 22. Front face mounting permits forward down-folding for bob-tailed operation or driving through low doors or the like. If down-folding to the rear is desired, bracket 30 may be mounted on the rear face of deflector 22. The brackets 30 are interchangeable from front to rear and from side to side for this purpose.

As discussed above, the angular position of wind deflector 22 is controllably adjusted by changing the particular hole 32 of support arm 31 through which quick disconnect fitting 38 securely interconnects support arm 31 with the rear spaced hole 27 of channel section 42. Furthermore, since this securement location is easily accessible, the ease of changing the angle or folding the wind deflector down is greatly enhanced.

The universal support system 24 is completed by rear bracket assembly 29. As discussed above, the strongest reinforced area in the rear of a typical truck cab is directly below the rain gutter. Since the rain gutter area may be at various levels below the top of the cab roof, depending upon the roof curvature and construction, bracket assembly 29 is completely adjustable to accommodate secure interconnection of bracket assembly 29 directly to the rear of the cab in the desired location, regardless of the height or angular variations present in the cab roof construction. In order to achieve this universal adjustability, bracket assembly 29 incorporates an elongated bolting plate 44, an adjustable position locating collar 45, amd a cab mounting member 46.

In the preferred embodiment, bolting plate 44 incorporates a plurality of spaced holes 47, arranged in two columns, with the upper terminating ends of bolting plate 44 pivotally secured to the sides of elongated channel member 42 by bolt means 40. Position locating collar 45 is bolted to plate 44, using bolt means 40, by securing bolt means 40 in the desired holes 47 of bolting plate 44 which positions the lowermost section of collar 45 with the desired rain gutter area. For ease of adjustability, collar 45 incorporates two elongated slots 48 which are positioned for cooperative association with holes 47. In the preferred embodiment, slots are employed in order to provide collar 45 with maximum ease of adjustability once a particular area has been determined.

As best seen in FIG. 3, at least two bolt means 40 should be employed to secure collar 45 to plate 44 with the bolt means being positioned in opposite ends of adjacent slots 48. In this way, any possible shifting of collar 45 along plate 44 will be eliminated.

The assembly of bracket 29 is completed by securing cab mounting member 46 directly to the rear of the cab below the gutter area through bolting holes 49. Mounting member 46 is pivotally interconnected with collar 45, using bolt means 40, in order to complete the secure bolting arrangement of rear bracket assembly 29. Also, the pivotal interconnection between mounting member 46 and collar 45 assures that member 46 can be easily secured to any cab wall, regardless of the wall curvature or slope. Furthermore, the secure mounting of member 46 to the cab wall in the rain gutter area, which is generally low on the back of the cab provides maximum strength, since the metal is in shear rather than in a bending condition. This low position also puts the bolt means below the cab roof liner, thereby allowing the installation of the bolt means without removing the headliner.

As shown in FIG. 2, front bracket 28 and rear bolting plate 44 are both mounted directly to elongated support member 26 with double direction locking washers 57 fitted between the adjacent contacting surfaces of these members. Since the double direction locking washers 57 are sandwiched directly between bracket 28 and channel member 41 and between plate 44 and channel member 42, these interconnected members are in secure frictional engagement with each other. Consequently, fore and aft movement of support member 26 is completely eliminated.

As it is now clearly apparent from the preceding description, the universally adjustable support system 24 of the present invention can be easily and quickly installed and secured to any cab roof structure using the identical parts and merely adjusting their parts for the particular size and shape of the cab roof. Clearly, this invention provides a unique combination of elements which interact to produce a synergistic result, heretofore completely unattainable with prior art units.

As is obvious to one skilled in the art, the complete elimination of individually sized hardware necessary for accommodating particular cab roof structures is extremely advantageous and provides a support system heretofore unobtainable. Of course, various minor modifications could be made to the particular type of hardware employed in support system 24 without departing from the scope of this invention.

In the preceding discussion, the universal support system 24, shown in FIG. 1, was fully described and discussed. This system, which is applicable for use on all land transport vehicles, has been found to be particularly useful on tractor-trailer combinations. However, the system described in FIG. 1 can also be employed on single chassis or straight truck vehicles.

In addition to the wind deflectors 22, other drag reducing equipment, such as vortex stabilizers, described and claimed in Walter S. Saunders' U.S. Pat. Nos. 3,697,120 and 3,971,586, can be mounted on the tractor-trailers in order to further assist in reducing the drag produced by side winds. However, the particular physical construction of a single chassis or straight truck vehicle provides a structure in which an alternative embodiment of the universal support system of the present invention can be employed with a vortex stabilizer mounted directly thereto.

Figure 4:
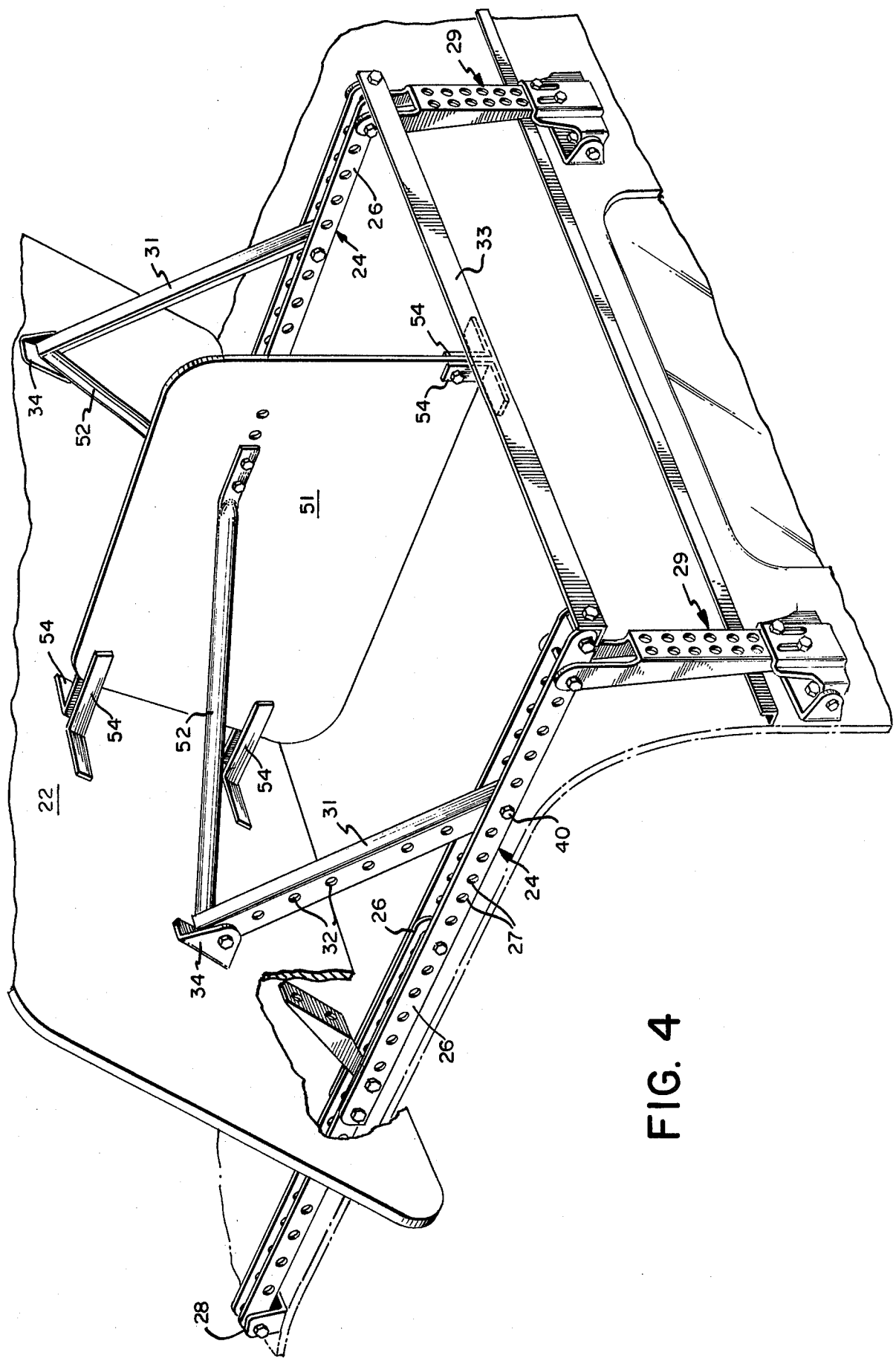
FIG. 4 is a perspective view of the universal support system of the present invention depicted for use on a single chassis vehicle with a wind deflector and vortex stabilizer mounted thereto.

In FIG. 4, wind deflector 22 and a vortex stabilizer 51 are shown securely supported by universal support system 24. The efficacy of vortex stabilizer 51 is fully disclosed and discussed in the Saunders patents mentioned above, and the use of vortex stabilizer 51 has been found to greatly increase the effective drag reduced, thereby achieving greater fuel economy.

In addition to the universal support system 24, only stiffening arms 52, angle irons 53 and angle braces 54 need be added for secure mounting of vortex stabilizer 51.

The universal support system 24 is adjusted, as described above, for secure interconnection to the roof of the cab along the front edge near the windshield and along the rear wall below the rain gutter, as shown in FIG. 4. However, the remaining hardware, although identical to the hardware used with the previous embodiment, is arranged in a slightly different fashion, for installation on the cab of a single chassis truck. In particular, wind deflector pivot-inducing bracket 30 is pivotally mounted to elongated support member 26, as described above, but is mounted to the front face of wind deflector 22.

Support arm 31 is pivotally mounted to support bracket 34, with bracket 34 secured to the rear face of wind deflector 22 in the same fashion as described above. However, the lower terminating end of support arm 31 is secured, using bolt means 40, to elongated channel 26 at the lowermost hole 32 of support arm 31 (FIG. 4). With this arrangement, wind deflector 22 can be angularly adjusted to be in the precise desired angular arrangement by adjusting the position of bracket 30 in elongated support member 26.

Control arm 33 provides lateral spacing between the two sides of the support assembly in both instances, and arm 33 is alternatively mountable between struts 31 or support members 26 (42). When mounted between rear lower ends of struts 31 (FIG. 1), the entire U-shaped assembly 31-33-31 can be disconnected from support member 42 and lowered behind the cab if space permits. Arm 33 provides simplified guiding of deflector 22 and struts 31 during down-folding or changing the angle of wind deflector 22. This assembly 31-33-31 is therefore highly useful on the cabs of tractor-trailer rigs.

On single-chassis trucks with limited space between cab and van, preferably control arm 33 is permanently connected between the rear ends of members 42 (FIG. 4), and this simplifies installation of the assemblies, by accurately spacing brackets 29 apart. Also, arm 33 provides rear lower corner support for the central fin vortex stabilizer 51, assuring that the downward thrust of stabilizer 51 is kept off the cab roof, avoiding buckling damage.

In this single chassis truck embodiment, transverse control arm 33 is thus employed as a brace and securement point for the lower rear edge of vortex stabilizer 51. Vortex stabilizer 51 is secured to arm 33 by mounting one leg of each of the angle brackets 54 directly to vortex stabilizer 51, and mounting the second leg of each of the angle brackets 54 to arm 33. In this way, the rear lower corner of vortex stabilizer 51 is secured in its desired position, without bearing on the relatively weak center roof area.

The secure assembly of vortex stabilizer 51 is completed by securing one of the mounting surfaces of each of the angle brackets 54 to the rear side of wind deflector 22 and securing the other mounting surface of each of the angle brackets 54 directly to vortex stabilizer 51, thereby securely mounting the front edge of vortex stabilizer 51 in position. The assembly is braced by mounting stiffening arms 52 in position extending from the rear surface of wind deflector 22 to the vertical sides of vortex stabilizer 51.

As is clearly understood from the above description, universal support system 24 securely mounts either a wind deflector or a wind deflector-vortex stabilizer combination to any land transport vehicle by employing all of the identical hardware. When the vortex stabilizer is also mounted, the additional assembly merely requires two stiffening arms and six angle brackets. Thus, the universality of the present system is clearly apparent with only minor additional equipment being required for the vortex stabilizer while all of the other hardware employed with the wind deflector alone is completely used in total. As a result, supply control of the hardware and ease of installation is optimized and a truly universal support system is achieved. Consequently, the support system of the present invention employs a plurality of elements, some of which have been used in the past, with new elements in a synergistic manner, achieving a support system that has long been sought but, until now, never achieved.

It will best be seen that the object set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention in which, as a matter of language, might be said to fall therebetween.

Having described our invention, what we claim is new and desire to secure by Letters Patent is:

1. Apparatus for supporting and securely mounting drag reducing equipment to a land transport vehicle comprising:
    A. a telescoping, interlocking, elongated support member, adjustably securable and firmly lockable in a plurality of various lengths;
    B. a first bracket pivotally secured to a forward portion of the elongated support member and positioned for bolting directly to the roof of the land transport vehicle;
    C. a second bracket
        a. pivotally secured to a rear portion of the elongated support member, and
        b. adjustable in a plurality of lengths for securement to the land vehicle at the optimum location regardless of the vehicle configuration;
    D. a drag reducer support bracket pivotally secured to the elongated support member and adjustably securable in a plurality of positions along the elongated support member; and
    E. a drag reducer supporting strut pivotally secured to the drag reducer and adjustably securable to the elongated support member in a plurality of various positions along the length of the strut and along the length of the elongated support member whereby the drag reducing equipment can be securely supported and mounted in any desired orientation to any land vehicle regardless of the vehicle's configuration.

2. The apparatus defined in claim 1, wherein said second bracket is further defined as comprising
    a. a bolting plate incorporating
        1. a plurality of spaced holes, and
        2. at least one arm member extending from said bolting plate in a plane substantially perpendicularly thereto, for a pivotable interconnection with the elongated support member,
    b. an adjustable mounting collar securable to said bolting plate in a plurality of locations, and
    c. an interconnection bracket pivotally engaged with said mounting collar and securely boltable at the desired location to the land vehicle, whereby the bracket is securely boltable to the rear wall of the cab of the land vehicle directly below the rain gutter, regardless of the cab configuration.

3. The apparatus defined in claim 1, wherein two complete sets of said apparatus are mounted in parallel to the land vehicle with the elongated support members thereof extending from front to rear on the roof of the land vehicle.

4. The apparatus defined in claim 1, further comprising double direction locking washers positioned between the opposed facing surfaces of the first bracket and the elongated support members and the opposed facing surfaces of the second bracket and the elongated support member, thereby eliminating unwanted shifting movement along the central axis of the support member.

5. Apparatus for supporting and securely mounting drag reducing equipment to a land transport vehicle comprising:
   A. a telescoping elongated support member, adjustably securable in a plurality of various lengths, and comprising two substantially U-shaped channel members
      a. slidingly engaged with each other, and
      b. incorporating a plurality of spaced holes along their parallel sides, whereby the over-all length of the elongated support member can be readily adjusted and secured in any desired length by boltingly interconnecting the two slidingly engaged channel members;
   B. a first bracket pivotally secured to a forward portion of the elongated support member and positioned for bolting directly to the roof of the land transport vehicle;
   C. a second bracket
      a. pivotally secured to a rear portion of the elongated support member, and
      b. adjustable in a plurality of lengths for securement to the land vehicle at the optimum location regardless of the vehicle configuration;
   D. a drag reducer support bracket pivotally secured to the elongated support member and adjustably securable in a plurality of positions along the elongated support member; and
   E. a drag reducer supporting strut pivotally secured to the drag reducer and adjustably securable to the elongated support member in a plurality of various positions along the length of the strut and along the length of the elongated support member.

6. The apparatus defined in claim 5, wherein said supporting strut is further defined as comprising an elongated L-shaped angle iron member incorporating a plurality of spaced holes along one leg thereof, whereby the effective length of said supporting strut is adjustable by mounting the supporting strut to the rear of the elongated channel member in any desired spaced hole along the length of the strut.

7. A universal support system for securely mounting drag reducing equipment to the roof of a cab of any land transport vehicle comprising:
   A. a telescoping, elongated, support member, adjustably securable in a plurality of various lengths and incorporating two substantially U-shaped channel members
      a. slidably engaged with each other, and
      b. incorporating a plurality of spaced holes along their parallel sides;
   B. a first bracket pivotally secured at a forward position of the elongated support member and angularly positionable for directly bolting to the roof of the land transport vehicle above the metal-reinforced windshield area thereof;
   C. a rear, adjustable bracket pivotally secured to a rear portion of the elongated support member and incorporating
      a. a bolting plate comprising:
         1. a plurality of spaced holes, and
         2. at least one arm member extending from said bolting plate in a plane substantially perpendicular thereto, assuring a pivotable interconnection with the elongated support member,
      b. an adjustable mounting collar securable to said bolting plate in a plurality of locations, and
      c. an interconnection bracket pivotally engaged with said mounting collar for secure bolting directly to the rear wall of a cab regardless of the cab wall configuration;
   D. a drag reducer support bracket pivotally secured to the elongated support member and adjustably positionable in a plurality of locations along the elongated support member; and
   E. a drag reducer supporting strut
      a. pivotally secured to the drag reducer,
      b. comprising a substantially elongated L-shape having a plurality of spaced holes along one side thereof, and
      c. adjustably securable to the elongated support member in a plurality of positions along the length of the struts and along the lengths of the elongated support member.

8. The support system defined in claim 7, wherein said drag reducer comprises a wind deflector.

9. The support system defined in claim 8, wherein said supporting strut is secured to the elongated support member by interconnecting quick disconnect fastening means between the rearwardmost hole of the elongated support member and one of the spaced holes along the supporting strut, thereby allowing the wind deflector to be easily pivotable through any angle desired by merely changing the particular spaced hole of the supporting strut which is securely attached to the elongated support member.

10. The support system defined in claim 9, wherein said system further comprises two support systems mounted to the roof of the cab of the land vehicle with the elongated support members extending, in parallel, from the front to the rear of the cab.

11. The support system defined in claim 10, wherein said system further comprises a transverse control arm connected between the lowermost edge of the parallel disposed supporting struts, for controlled manual movement of said wind deflector before secure mounting of the supporting strut to the elongated support member in the desired angular position.

12. The support system defined in claim 7, wherein said drag reducing equipment is further defined as comprising a wind deflector and a vortex stabilizer combination.

13. The support system defined in claim 12, wherein said support system is further defined as comprising two support systems mounted to the roof of the cab of the land transport vehicle with the elongated support members both extending, in parallel, from the front to the rear of the cab roof.

14. The support system defined in claim 13, wherein said system is further defined as comprising a transverse control arm mounted at each of its teminating ends to the rear of one of the elongated support members and incorporating supporting braces along its length for securely holding the vortex stabilizer in position.

15. The support system defined in claim 14, wherein said support system further comprises:
- F. a plurality of bracket members securing a forward edge of the vortex stabilizer to the rear surface of the wind deflector, and
- G. at least one stiffening arm extending from the rear surface of the wind deflector to the side surface of the vortex stabilizer, securely holding and supporting the vortex stabilizer in the desired configuration.

16. Apparatus for supporting and securely mounting drag reducing equipment to a land transport vehicle comprising:
- A. an elongated support member, adjustably securable to the vehicle;
- B. a first bracket pivotally secured to a forward portion of the elongated support member and positioned for bolting directly to the roof of the land transport vehicle;
- C. a second bracket
  - a. pivotally secured to a rear portion of the elongated support member, and
  - b. adjustable in a plurality of lengths for securement to the land vehicle at the optimum location regardless of the vehicle configuration;
- D. a drag reducer support bracket pivotally secured to the elongated support member and adjustably securable in a plurality of positions along the elongated support member; and
- E. a drag reducer supporting strut pivotally secured to the drag reducer and adjustably securable to the elongated support member in a plurality of various positions along the length of the strut and along the length of the elongated support member whereby the drag reducing equipment can be securely supported and mounted in any desired orientation to any land vehicle regardless of the vehicle's configuration.

17. Apparatus for supporting and securely mounting drag reducing equipment to a land transport vehicle incorporating right and left support assemblies each comprising:
- A. an elongated support member, adjustably securable to the vehicle;
- B. a first bracket pivotally secured to a forward portion of the elongated support member and positioned for bolting directly to the roof of the land transport vehicle;
- C. a second bracket
  - a. pivotally secured to a rear portion of the elongated support member, and
  - b. adjustable in a plurality of lengths for securement to the land vehicle at the optimum location regardless of the vehicle configuration;
- D. a drag reducer support bracket pivotally secured to the elongated support member and adjustably securable in a plurality of positions along the elongated support member; and
- E. a drag reducer supporting strut pivotally secured to the drag reducer and adjustably securable to the elongated support member in a plurality of various positions along the length of the strut and along the length of the elongated support member and also incorporating a laterally extending control arm connecting the rear ends of the right and left support assemblies in predetermined spaced relationship, whereby the drag reducing equipment can be securely supported and mounted in any desired orientation to any land vehicle regardless of the vehicle's configuration.

18. The apparatus defined in claim 17 wherein the control arm connects the rear lower ends of the supporting struts to form a U-shaped subassembly, facilitating installation, downfolding and repositioning of the drag, reducer between its various positions.

19. The apparatus defined in claim 17 wherein the control arm connects the rear ends of the elongated support members, providing accurate lateral spacing during installation of the support assemblies and central underlying support above the vehicle roof for the rear portion of the drag reducer equipment.

* * * * *